US008825921B2

(12) United States Patent
Westwick et al.

(10) Patent No.: US 8,825,921 B2
(45) Date of Patent: Sep. 2, 2014

(54) TECHNIQUE AND SYSTEM TO CONTROL A DRIVER STATE

(75) Inventors: Alan L. Westwick, Austin, TX (US); Thomas S. David, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 647 days.

(21) Appl. No.: 12/976,405

(22) Filed: Dec. 22, 2010

(65) Prior Publication Data

US 2012/0165960 A1 Jun. 28, 2012

(51) Int. Cl.
*G06F 13/12* (2006.01)
*G06F 3/00* (2006.01)

(52) U.S. Cl.
USPC ............ 710/19; 710/2; 710/5; 710/8; 710/15; 710/32

(58) Field of Classification Search
None
See application file for complete search history.

(56) References Cited

U.S. PATENT DOCUMENTS

2011/0204820 A1* 8/2011 Tikkanen et al. ............ 315/294

* cited by examiner

*Primary Examiner* — Scott Sun
(74) *Attorney, Agent, or Firm* — Trop, Pruner & Hu, P.C.

(57) ABSTRACT

A technique includes executing at least one instruction on a processor to control a driver circuit; and in response to a predetermined trigger condition, asynchronously causing the driver circuit to enter a predetermined state.

20 Claims, 5 Drawing Sheets

TECHNIQUE AND SYSTEM TO CONTROL A DRIVER STATE

BACKGROUND

The disclosure generally relates to a technique and system to control a driver state.

Electronic systems typically employ the use of current drivers for purposes of using relatively low or no current signaling to control various devices in the system, such as light emitting diodes (LEDs), motors, high power transistors, etc. A typically current driver may include a transistor, such as a metal-oxide-semiconductor field-effect-transistor (MOSFET), to control the current to the device. The MOSFET conducts current through its drain-source path, depending on a voltage between the gate and source terminals of the MOSFET.

SUMMARY

In an exemplary embodiment, a technique includes executing at least one instruction on a processor to control a driver circuit; and in response to a predetermined trigger condition, asynchronously causing the driver circuit to enter a predefined state.

In another exemplary embodiment, an apparatus includes a processor core and a controller. The processor core is adapted to execute at least one instruction to control a driver circuit, and the apparatus is adapted to, in response to a predetermined trigger condition, asynchronously cause the driver circuit to enter a predefined state.

In yet another exemplary embodiment, an apparatus includes a driver, a processor and a controller, which are all components of an integrated circuit. The processor executes at least one instruction to control the driver to regulate an electrical device, and the controller is adapted to, in response to a predetermined trigger condition, bypass control of the driver by the processor to cause the driver to enter a predefined state.

Advantages and other features of the invention will become apparent from the following drawing, description and claims.

DETAILED DESCRIPTION

Figure 1:
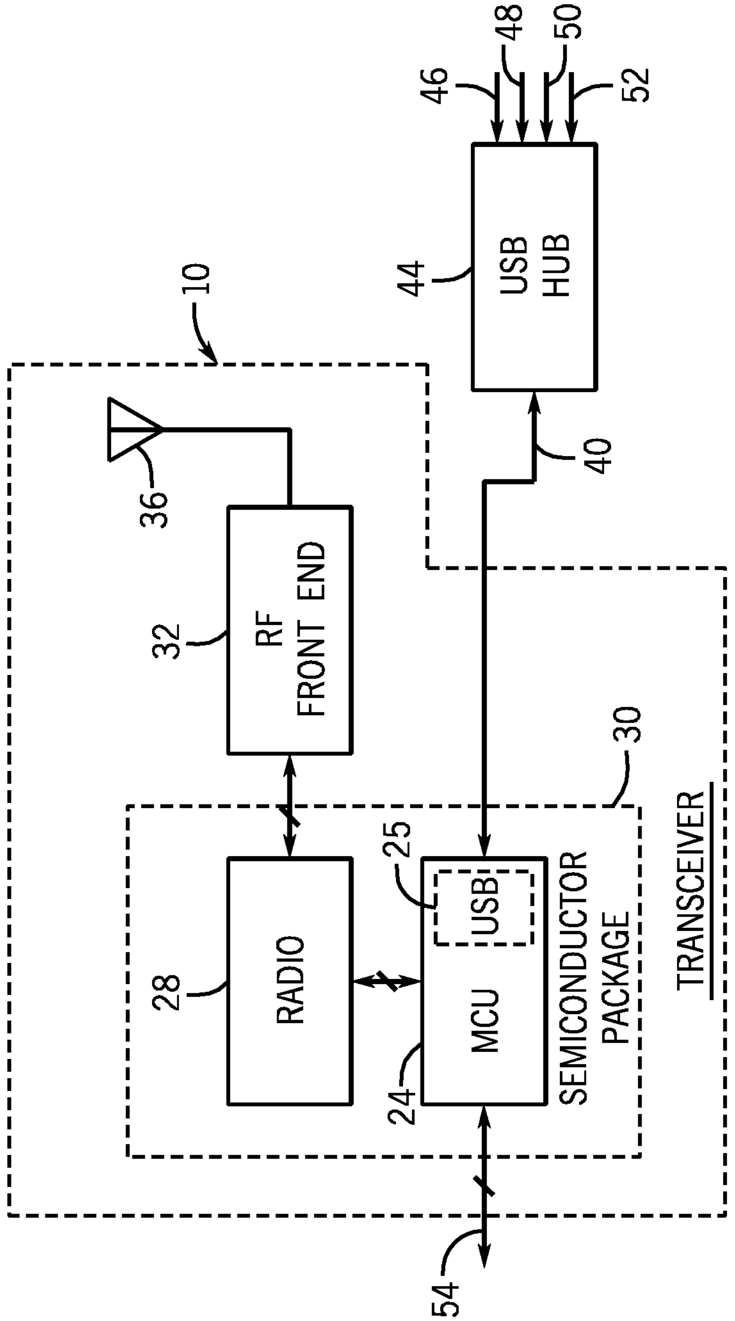
FIG. 1 is a schematic diagram of a transceiver system according to an embodiment of the invention.

Referring to FIG. 1, in accordance with embodiments of the invention disclosed herein, a microcontroller unit (MCU) 24 may be used in a variety of applications, such as applications in which the MCU 24 controls various aspects of a transceiver 10 (as a non-limiting example). In this regard, the MCU 24, for this particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of the smart power meter as well as communicate with devices over a Universal Serial Bus (USB) 40. For example, various USB links 46, 48, 50 and 52 may communicate via a hub 44 and USB 40 with the transceiver 10 for such purposes as communicating with a residential computer regarding power usage of various appliances, communicating with these appliances to determine their power usages, communicating with the appliances to regulate their power usages, etc. For purposes of communicating with the USB 40, the MCU 24 has an integrated USB interface 25, in accordance with some embodiments of the invention.

Figure 2:
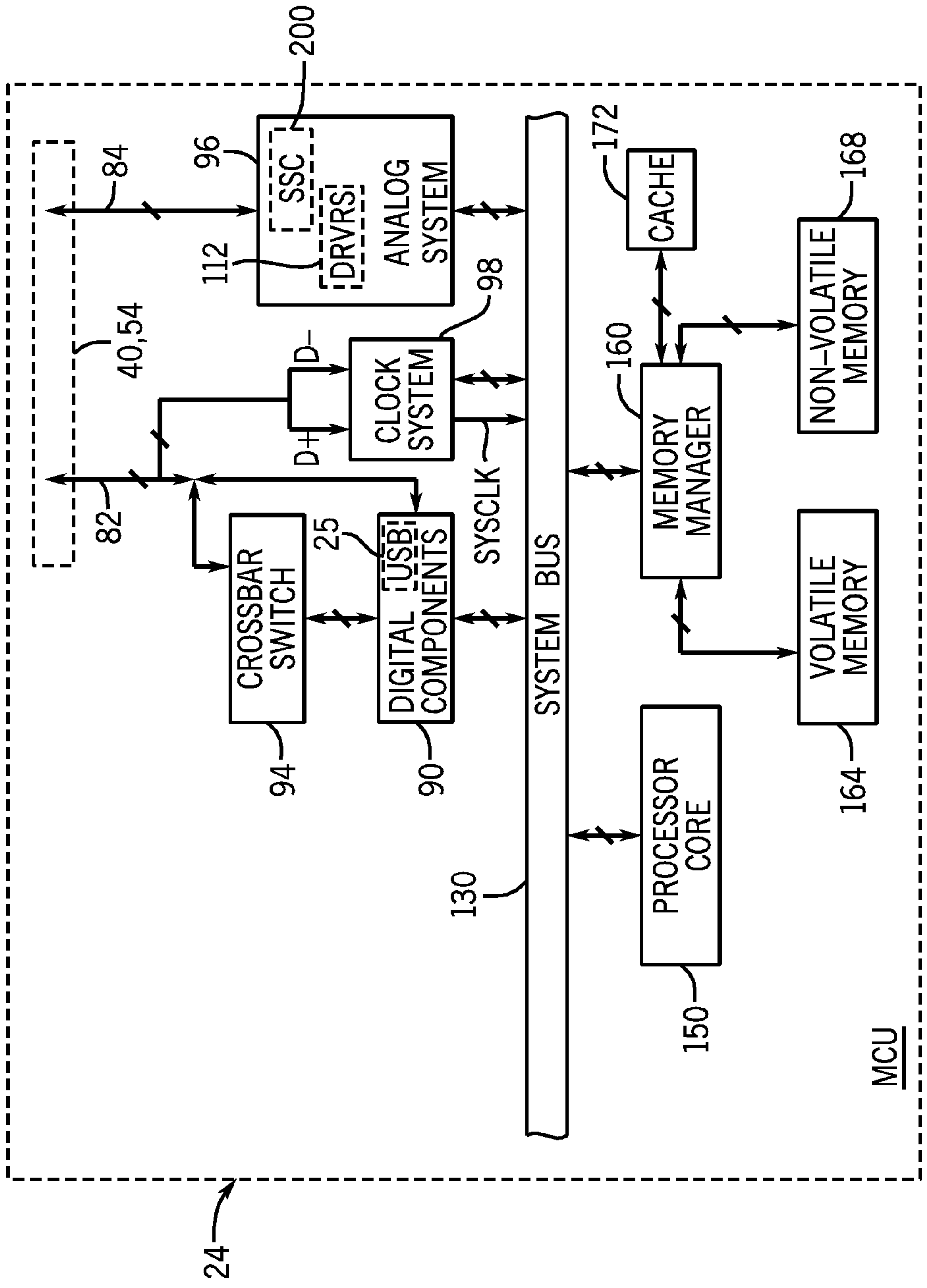
FIG. 2 is a schematic diagram of a microcontroller unit according to an embodiment of the invention.

In accordance with embodiments of the invention, the MCU 24 is a "system on a chip," which includes various components, such as the components that are depicted in FIG. 2, which may be fabricated on the same die. Referring to FIG. 2, among these components, the MCU 24 includes a processor core 150. As a non-limiting example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

The MCU 24 also includes various digital peripheral components 90, such as (as non-limiting examples) the USB interface 25, a programmable counter/timer array (PCA), a universal asynchronous receiver/transmitter (UART), a system management bus (SMB) interface, a serial peripheral interface (SPI), etc. The MCU unit 24 may include a crossbar switch 94, which permits the programmable assigning of the digital peripheral components 90 to digital output terminals 82 of the MCU 24. In this regard, the MCU 24 may be selectively configured to selectively assign certain output terminals 82 to the digital peripheral components 90.

In accordance with embodiments of the invention, the MCU 24 also includes an analog system 96, which includes various interfaces to analog terminals 84 of the MCU 24. For example, the analog system 96 may include various components that receive analog signals, such as analog-to-digital converters (ADCs), comparators, etc. Moreover, the analog system 96 may include one or more low dropout (LDO) converters. As also depicted in FIG. 2, the MCU 24 includes current driver circuits (called "drivers 112" herein), which may be generally controlled by software of the MCU 24, i.e., controlled by the processor core 150 executing software instructions.

Among its other features, the MCU 24 also includes a clock system 98, which supplies a system clock signal (called "SYSCLK" in FIG. 2) to the system bus 130, which is used to clock operations, for example, of the processor core 150. In general, the clock system 98 recovers a clock signal used in the communication of bursty data on data lines (labeled as the "D+" and "D−" in FIG. 2) over the USB 40 and may use this recovered clock signal as the SYSCLK signal.

For purposes of controlling the state of a given driver 112, the processor core 150, in general, executes at least one software instruction. As non-limiting examples, under software control, the drivers 112 may control the communication of current between supply voltage rails, the communication of power to light emitting diodes (LEDs), control the communication of power to an electrical motor, control coupling connections for a bus, control switches to selectively communicate electrical power, etc. Regardless of the particular application of a given driver 112, a trigger condition may arise for which corrective action needs to be taken; and this corrective action involves transitioning the driver 112 to a predefined safe state.

As a non-limiting example, one of the drivers 112, when "turned on," may be creating a current path through an LED to turn the LED "on". It is possible that the driver 112 may not be rated for communicating the LED's current continuously, but rather, the driver 112 may be operated in an intermittent fashion pursuant to an on/off duty cycle, which permits the average current through the driver 112 to not exceed the current limit. More specifically, the processor 150, under software control, may execute instructions for purposes of turning on and off the driver 112. This software control may rely on the use of a monitoring circuit, such as a timer, which alerts the processor core 150 (such as through the use of an interrupt) when it is time to turn on and off the LED. However, such a control scheme may not be entirely reliable, as the executing software may have errors, or "bugs"; the processor core 150 may be currently executing other code and thus may not be aware that action is needed; the system clock to the processor core 150 may be interrupted due to a crystal failure; etc.

In accordance with embodiments of the invention disclosed herein, each of the drivers 112 may be asynchronously transitioned to a predetermined safe state by hardware, thereby overriding the software control by the processor core 150. Therefore, should the driver 112 be supplying current to a device that incurs a short circuit; the driver 112 be supplying current to a failed component; the driver 112 be supplying current exceeding a predefined duty cycle; etc., hardware of the MCU 24 responds to this trigger condition to asynchronously transition the driver 112 to a safe state, without depending on the execution of software by the processor core 150.

More specifically, in accordance with some embodiments of the invention, the analog subsystem 96 includes a safe state controller 200, which is programmable with independently selectable safe states for the drivers 112. In accordance with some embodiments of the invention, the safe state controller is hardware-based logic, although other variations are contemplated, in accordance with various embodiments of the invention. Regardless of the particular implementations, the safe state controller 200 monitors signals indicative of trigger conditions for the respective drivers 112; and should the safe state controller 200 detect a trigger condition for a given driver 112, the safe state controller 200 asynchronously transitions the driver 112 to the programmed safe state.

Figure 3:
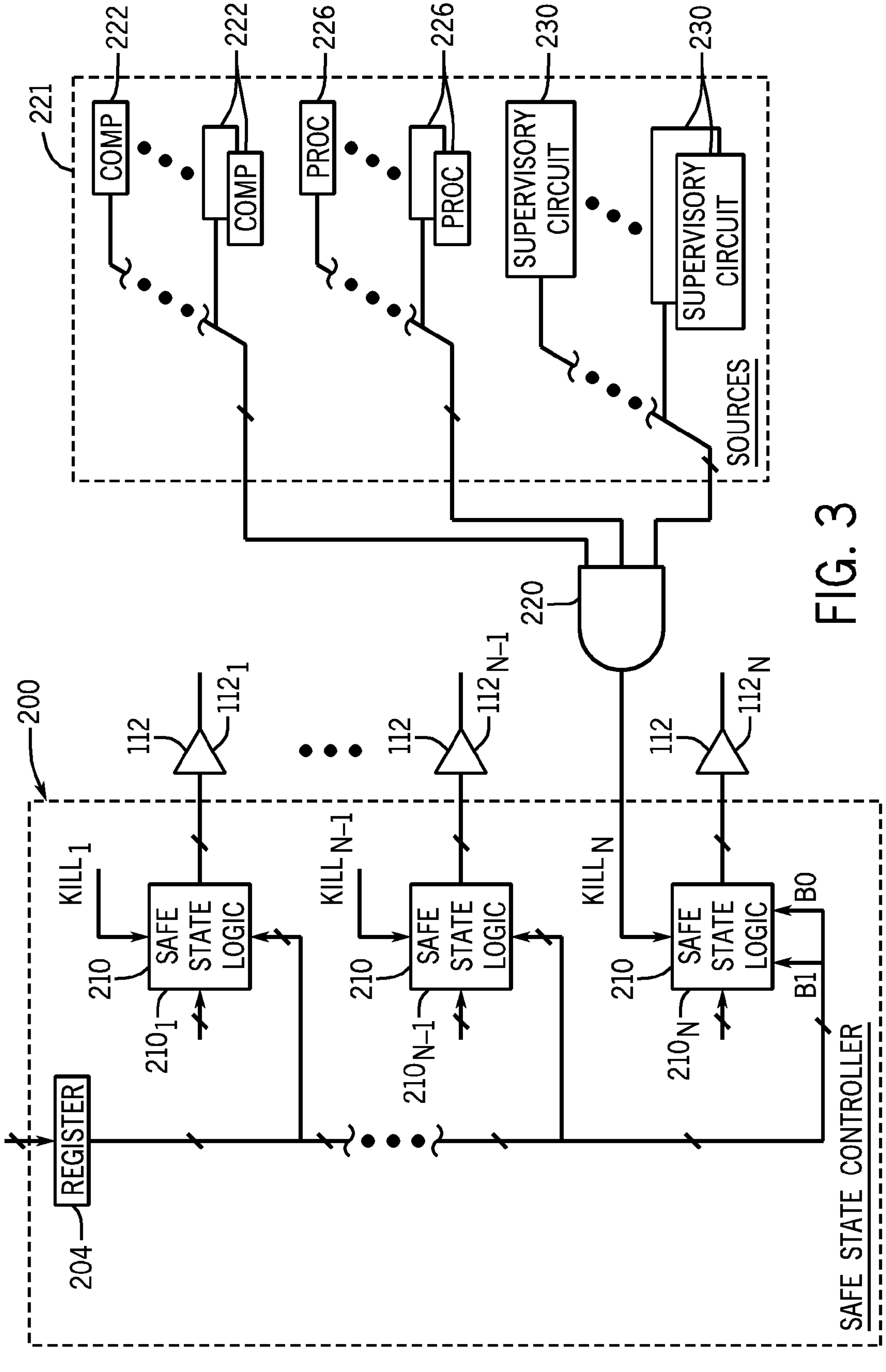
FIG. 3 is a schematic diagram of a driver safe state system according to an embodiment of the invention.

Referring to FIG. 3 in conjunction with FIG. 2, more specifically, in accordance with some embodiments of the invention, the safe state controller 200 includes a memory, such as a register 204, which, depending on the particular implementation, may be programmed with bits that correspond to the safe states for the various drivers 112. More specifically, in accordance with some embodiments of the invention, the register 204 stores different groups of bits, where each group indicates the corresponding safe state for a given driver 112. As non-limiting examples, the safe states may include at least the following: a state in which the driver 112 is turned "on" to thereby conduct current from a load to a negative supply rail; a state in which the driver 112 is turned on to conduct current from a positive supply rail to a load; and a state which the driver 112 is turned "off," or tri-stated, in which means that the positive and negative supply rails are isolated from the load.

In accordance with some embodiments of the invention, the register 204 is a one-time programmable register. In other words, the register 204 may be programmed via one configuration write operation from the processor core 150 for purposes of setting the safe states for the drivers 112. In other embodiments of the invention, the register 204 may be writable only if a predetermined key is provided with the write operation. Thus, many variations are contemplated and are within the scope of the appended claims.

As depicted in FIG. 3, the controller 200 may include a set of safe state logic 210 for each driver 112. In the example shown in FIG. 3, sets of safe state logic, denoted by reference numerals $\mathbf{210}_1$, $\mathbf{210}_{N\text{-}1}$ and $\mathbf{210}_N$, are provided for drivers $\mathbf{112}_1$ $\mathbf{112}_{N\text{-}1}$ and $\mathbf{112}_N$, respectively. For the specific driver $\mathbf{112}_N$, the safe state logic $\mathbf{210}_N$ receives two bit signals B1 and B0, which correspond to two corresponding bits of the register 204. These bits, in turn, indicate a given programmable safe state for the driver $\mathbf{112}_N$. Upon recognition of the trigger condition (the assertion, or driving, of a signal called "$KILL_N$" in FIG. 3, which gives rise to a "kill signal"), the safe state logic $\mathbf{210}_N$ transitions the driver $\mathbf{112}_N$ to the programmed, predefined safe state.

The predetermined trigger signals (called "$KILL_1$ . . . $KILL_{N\text{-}1}$ and $KILL_N$" in FIG. 3) may be generated by one or numerous potential sources 221, depending on the particular embodiment of the invention. For the specific $KILL_N$ signal, the signal is generated at the output of an OR gate 220, which may receive signals from various circuits that may potentially generate the trigger signal to transition the driver $\mathbf{112}_N$ into the predetermined safe state. Although FIG. 3 depicts numerous potential sources 221 for such a signal, the given KILL signal for a given driver 112 may be generated by only a single source or more than the number of sources depicted in FIG. 3, depending on the particular embodiment of the invention. For this example, the sources 221 may be external to or internal to the semiconductor package 30 (see FIG. 1) and may include (as non-limiting examples) comparators 222, processors 226 (processors or processing cores), supervisory circuits 230 (timers, etc.).

In accordance with other embodiments of the invention, a single KILL signal may operate on multiple sets of safe state logic 210. As a non-limiting example, in accordance with some embodiments of the invention, a single KILL signal may be generated, with programmable register bits being used to identify which drivers 112 are responsive to the KILL signal. Thus, many variations are contemplated and are within the scope of the appended claims.

Figure 4:
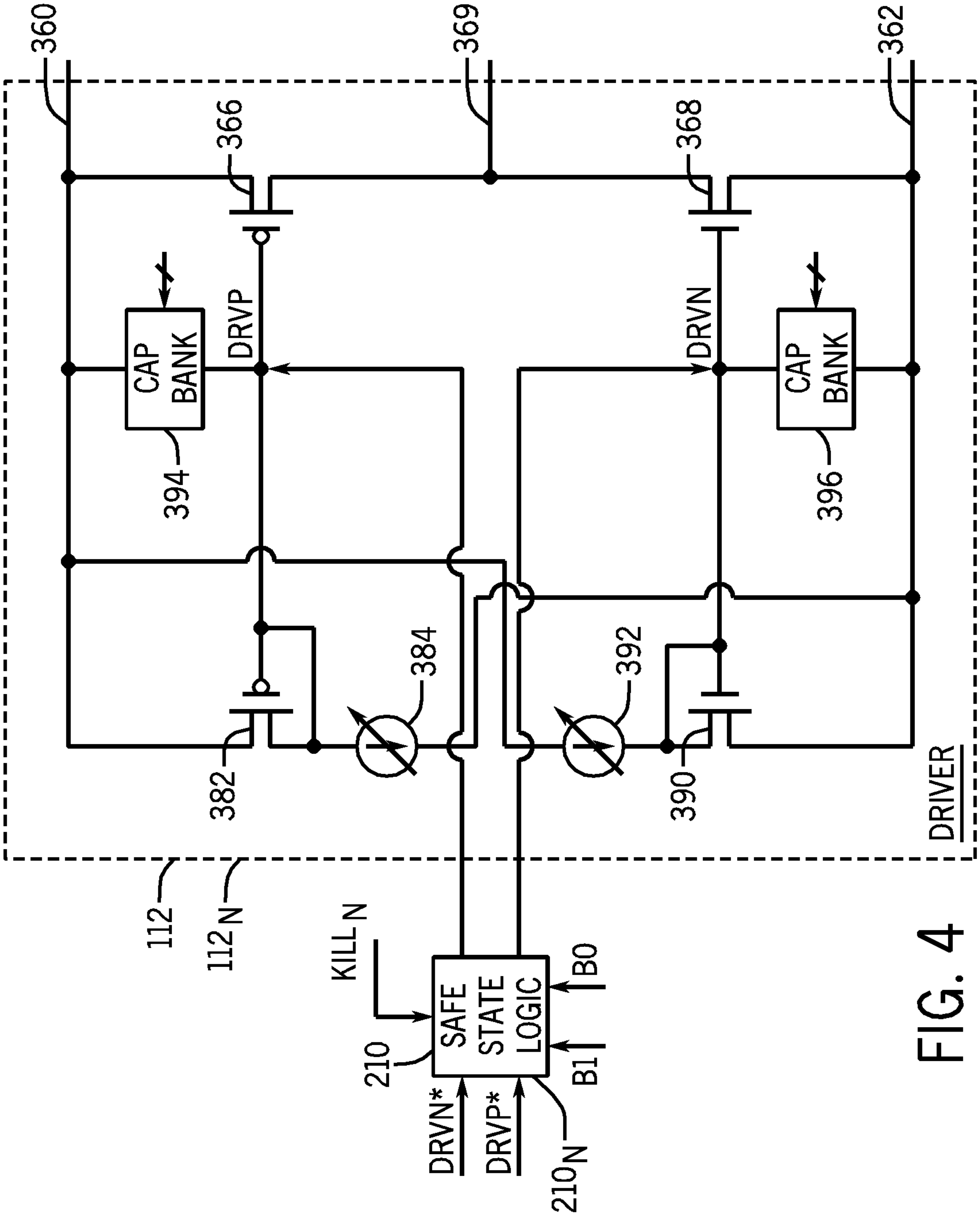
FIG. 4 is a schematic diagram of the driver according to an embodiment of the invention.

FIG. 4 generally depicts an exemplary embodiment for the driver $\mathbf{112}_N$ and the associated safe state logic $\mathbf{210}_N$ of the safe state controller 200. As shown in FIG. 4, for this example, the driver 112 may be a push-pull driver that has four possible states: a source state in which the driver 112 is "on" and couples its output terminal 369 to a positive supply rail 360; a sink state in which the driver 112 is "on" and pulls its output terminal 369 to a negative supply rail 362; an off state in which the transistors that are coupled to the output terminal 369 are turned off, or "tri-stated."

More specifically, in accordance with some embodiments of the invention, the push-pull architecture of the driver 112 is formed from a p-channel MOSFET 366 (hereinafter called the "pMOSFET 366"), which has its source terminal coupled to the positive supply rail 360 and has its drain terminal coupled to the output terminal 369. This push-pull architecture also includes an n-channel MOSFET 368 (hereinafter called the "nMOSFET 368"), which has its drain terminal coupled to the output terminal 369 and has its source terminal coupled to the negative supply rail 362. The gate terminal of the pMOSFET 366 receives a signal (called "DRVP" herein); and the gate terminal of the nMOSFET 368 receives a signal (called "DRVN" herein).

For the source safe state, the output terminal 369 is pulled to the positive supply rail 360, the DRVP signal is asserted, or driven low, and the DRVN signal is also de-asserted or driven low. This causes the pMOSFET 366 to conduct current to its main source-drain current path between the output terminal 369 and the positive supply rail 360. Moreover, the de-assertion of the DRVN signal turns off the nMOSFET 368.

For the sink safe state, the DRVP and DRVN signals are both driven high. For these signal states, the nMOSFET 368 conducts current through its main drain-source current path to couple the output terminal 369 to the negative supply rail 362; and the pMOSFET 366 is turned off.

For the off state of the driver 112, the DRVP signal is asserted, or driven high, and the DRVN signal is de-asserted, or driven low. These signal states place the n-channel MOSFET 368 and p-channel MOSFET 366 in respective off states, leaving the output terminal 369 essentially floating.

As long as the $\text{KILL}_N$ signal is de-asserted, or driven low (for this example), the safe state logic $\mathbf{210}_N$ passes two corresponding signals (called "DRVN*" and "DRVP*" in FIG. 4) through to produce the corresponding DRVP and DRVN signals, respectively; and thus, the driver 112 is not regulated to a predetermined safe state. However, when the $\text{KILL}_N$ signal is asserted, the safe state logic $\mathbf{210}_N$ generates the DRVP and DRVN signals on the basis of the corresponding bits (as indicated by the B1 and B0 signals) from the register 240 (see FIG. 3). The state table describing the states of the various signals is set forth below:

TABLE 1

| KILL | DRVN* | DRVP* | B1 | B0 | DRVN | DRVP | DRIVER STATE |
|---|---|---|---|---|---|---|---|
| H | D/C | D/C | L | L | L | H | OFF |
| H | D/C | D/C | L | H | H | H | SINK |
| H | D/C | D/C | H | L | L | L | (ON) SOURCE |
| H | D/C | D/C | H | H | DRVN* | DRVP* | (ON) IGNORE KILL |
| L | L | L | D/C | D/C | L | L | SOURCE (ON) |
| L | H | H | D/C | D/C | H | H | SINK (ON) |
| L | L | H | D/C | D/C | L | H | OFF |

Figure 5:
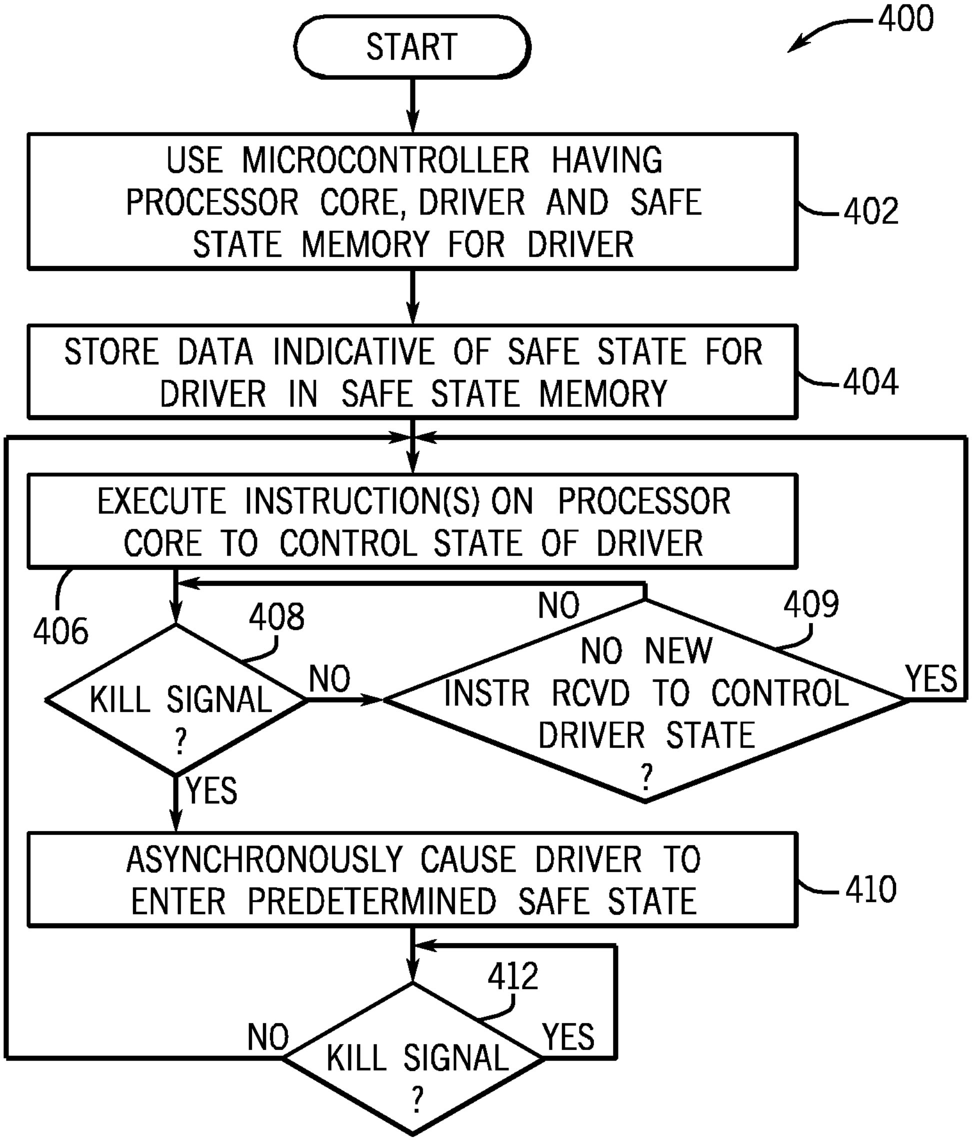
FIG. 5 is a flow diagram depicting a technique to regulate a driver state according to an embodiment of the invention.

To summarize, in accordance with some embodiments of the invention, a technique 400 that is depicted in FIG. 5 may be used for purposes of controlling a driver safe state. The technique 400 includes using a microcontroller having a processor core, driver and safe state memory for the driver, pursuant to block 402. The microcontroller and its components may be part of an integrated circuit, i.e., may be part of the same semiconductor package and may, depending on the particular embodiment of the invention, be fabricated in the same die. Data indicative of a safe state for the driver is stored in a safe state memory, pursuant to block 404. At least one instruction is executed on the processor core to control a state of the driver, pursuant to block 406. Upon the occurrence of a kill signal (diamond 408), the driver asynchronously enters a predetermined safe state, pursuant to block 410. If no kill signal is received (e.g., the appropriate KILL signal is not asserted) and a new instruction is received by the processor core to control the driver state (diamond 409), then control returns to block 406. Otherwise, if neither the kill signal is received nor a new instruction is received, then control returns to diamond 408. After entering the safe state, the driver is maintained in the safe state until the kill signal disappears (diamond 412) at which time control transitions back to block 406.

Referring back to FIG. 4, among the other features of the driver 112, in accordance with some embodiments of the invention, the driver 112 includes circuitry to programmably control the slew rate of the driver 112. As a non-limiting example, in accordance with some embodiments of the invention, a programmable capacitor bank 394 is coupled between the positive supply rail 360 and the gate terminal of the pMOSFET 366. In general, the capacitor bank 394 contains capacitors and switches that may be selectively activated and deactivated for purposes of programmably establishing a gate-to-source capacitance across the pMOSFET 366. In this regard, in accordance with some embodiments of the invention, the processor core 150 may program a particular capacitive value for the capacitor bank 394 for purposes of programming a slew rate for the driver 112. The driver 112 also includes a capacitor bank 396 that is also programmable to establish the slew rate by establishing programmable gate to source capacitance for the nMOSFET 368. Like the capacitor bank 394, the capacitance value of the capacitor bank 396 may be programmed by the processor core 150.

Among its other features, the driver 112 may also include a programmable current limit. For example, in accordance with some embodiments of the invention, the driver 112 has a programmable source current limit that is established by a current minor that is formed by a pMOSFET 382, the pMOSFET 366 and an adjustable, or programmable, current source 384 (a digital-to-analog converter (DAC) having a programmable analog output current that is a function of a set of input bits, for example). The source terminal of the pMOSFET 382 is coupled to the positive supply rail 360; and the gate and drain terminals of the pMOSFET 382 are coupled together and coupled to one terminal of the current source 384. The other terminal of the current source 384, in turn, is coupled to the negative supply rail 362. Due to this arrangement, when the pMOSFET 366 conducts current through its source-drain path, the maximum current through this path is proportional to the current established by the current source 384.

In a similar arrangement, to establish the sink current limit, the driver 112 may include a current minor formed from an nMOSFET 390, the nMOSFET 368 and a programmable current source 392. The gate and drain terminals of the nMOSFET 390 are coupled together and coupled to one terminal of the current source 392. The other terminal of the current source 392 is coupled to the positive supply rail 360, and the source terminal of the nMOSFET 390 is coupled to the negative supply rail 362. Due to this arrangement, the current source 392 may be programmed to establish the maximum current for the drain source current path of the nMOSFET 368 when the nMOSFET 368 is turned on. In accordance with some embodiments of the invention, the current sources 384 and 392 may be programmed using registers that are accessible via writes by the processor core 150 (see FIG. 2).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:

executing at least one instruction on a processor to control a driver circuit; and in response to a predetermined trigger condition, bypass control of the driver circuit by the processor to cause the driver circuit to enter a predefined state.

2. The method of claim 1, wherein bypassing the driver circuit comprises asynchronously causing an output terminal of the driver circuit to enter the predefined state.

3. The method of claim 1, further comprising:

in response to the trigger condition, retrieving data indicative of the predetermined state from a memory, wherein bypassing control of the driver comprises controlling the driver circuit based on the retrieved data.

4. The method of claim 1, further comprising:

generating a signal indicative of the trigger condition in response to at least one of the following: a detected fault condition, a signal generated by the processor and a signal generated by a supervisory circuit.

5. The method of claim 1, wherein the processor and the driver circuit are part of an integrated circuit, further comprising:

receiving a signal indicative of the trigger condition, the signal originating from a source circuit that is part of the integrated circuit.

6. The method of claim 1, further comprising:

prior to occurrence of the trigger condition, programming the predefined state to be one of the following: a first state in which the driver circuit electrically couples a first supply rail to a load of the driver circuit; a second state in which the driver circuit electrically couples the load to a second supply rail; and a third state in which the driver circuit is turned off.

7. The method of claim 1, further comprising:

receiving a signal indicative of the trigger condition from a source circuit that is not part of an integrated circuit containing the processor and the driver circuit.

8. The method of claim 1, further comprising programming at least one of a slew rate and a current limit for the driver circuit.

9. An apparatus comprising:

a processor core adapted to execute at least one instruction to control a driver circuit; and a controller adapted to, in response to a predetermined trigger condition, bypass control of the driver circuit to cause the driver circuit to enter a predetermined state.

10. The apparatus of claim 9, further comprising:

an integrated circuit containing the processor; and a pad fabricated on the integrated circuit and being accessible externally, wherein the controller is adapted to asynchronously cause the pad to enter a predetermined state.

11. The apparatus of claim 9, wherein the driver circuit is part of the integrated circuit.

12. The apparatus of claim 9, further comprising:

a memory to store data indicative of the predetermined state, wherein the controller is adapted to retrieve the data from the memory and control the driver circuit based on the data.

13. The apparatus of claim 12, wherein the memory comprises a register.

14. The apparatus of claim 9, wherein the trigger condition is generated in response to at least one of the following: a detected fault condition, a signal generated by a processing core and a signal generated by a supervisory circuit.

15. The apparatus of claim 9, wherein the processor core and the circuitry are part of the same integrated circuit, further comprising a circuit being part of the integrated circuit to generate a signal to indicate the trigger condition.

16. The apparatus of claim 9, wherein the processor core and the circuitry are part of the same integrated circuit, further comprising a pad being part of the integrated circuit and being exposed to receive a signal originating externally and being indicative of the trigger condition.

17. The apparatus of claim 9, wherein the processor core is adapted to program the predetermined state to be one of the following: a first state in which the driver circuit electrically couples a first supply rail to a load of the driver circuit; a second state in which the driver circuit electrically couples the load to a second supply rail; and a third state in which the driver circuit is turned off.

18. An apparatus comprising:

an integrated circuit comprising a driver, processor and a controller; wherein the processor is adapted to execute at least one instruction to control the driver to control an electrical device; and the controller is adapted to, in response to a predetermined trigger condition, bypass control of the driver by the processor to cause the driver to enter a predefined state.

19. The apparatus of claim 18, wherein at least one of a slew rate and a current limit are adapted to be programmed by the processor .

20. The apparatus of claim 18, wherein the controller is adapted to asynchronously transition the driver into the predefined state.

* * * * *